United States Patent
Paulson et al.

(10) Patent No.: US 6,751,900 B1
(45) Date of Patent: Jun. 22, 2004

(54) FISHING DEVICE

(76) Inventors: Kerry Paulson, 1048 Harwood, Green Bay, WI (US) 54313; Louis Skinkis, E4641 Pheasant Rd., Algoma, WI (US) 54201

( * ) Notice: Subject to any disclaimer, the term of this patent is extended or adjusted under 35 U.S.C. 154(b) by 0 days.

(21) Appl. No.: 10/353,727

(22) Filed: Jan. 29, 2003

(51) Int. Cl.$^7$ ................................................ A01K 97/12
(52) U.S. Cl. ............................................................ 43/15
(58) Field of Search ................................. 43/15, 10, 12, 43/4.5

(56) References Cited

U.S. PATENT DOCUMENTS

| | | | | |
|---|---|---|---|---|
| 77,893 A | * | 5/1868 | Koehler | 43/15 |
| 279,556 A | * | 6/1883 | Fisher | 43/15 |
| 2,177,912 A | * | 10/1939 | Spitz et al. | 43/15 |
| 2,766,543 A | * | 10/1956 | Beck | 43/16 |
| 2,799,111 A | * | 7/1957 | Voboril | 43/15 |
| 2,810,981 A | * | 10/1957 | Littau | 43/16 |
| 2,835,066 A | * | 5/1958 | Spilker | 43/21.2 |
| 2,851,812 A | * | 9/1958 | Beck | 43/15 |
| 2,924,038 A | * | 2/1960 | Dahlgren | 43/16 |
| 2,984,039 A | * | 5/1961 | Willey | 43/15 |
| 3,686,785 A | | 8/1972 | Dixon | |
| 3,724,115 A | | 4/1973 | Derie | |
| 4,193,220 A | | 3/1980 | Bourquin et al. | |
| 4,262,440 A | * | 4/1981 | Sagal | 43/16 |
| 4,354,324 A | | 10/1982 | Eblen | |
| 4,993,181 A | | 2/1991 | Cooper | |
| 5,249,387 A | | 10/1993 | Slocum et al. | |
| 5,345,708 A | * | 9/1994 | Loyd | 43/21.2 |
| 5,408,779 A | * | 4/1995 | Parker | 43/15 |
| 5,809,684 A | * | 9/1998 | Carter et al. | 43/16 |

OTHER PUBLICATIONS

"The Original Whip–Up", IN–Fisherman magazine, Feb. 1997, http://members.aol.com/slamcoinc/whipup.ht.

* cited by examiner

Primary Examiner—Charles T. Jordan
Assistant Examiner—Jordan Lofdahl
(74) Attorney, Agent, or Firm—Boyle Fredrickson Newholm Stein & Gratz, S.C.

(57) ABSTRACT

A hook setting mechanism used with a fishing device is provided. The mechanism includes an arm pivotally secured to a rod holder such that the arm can pivot between a vertical position to a position where the arm is engaged with the base. The arm further includes an opening in which a trigger is movably disposed that includes a stay and a guide spaced from one another on the trigger. The stay is releasably engageable with an eyelet on a fishing pole while the guide properly positions the fishing line on the trigger such that any downward force on the line in the guide by a fish serves to disengage the eyelet from the stay, consequently setting a hook in the mouth of the fish. The disengagement of the rod and the trigger also enables the arm to pivot from the vertical position towards the base, moving the arm and the trigger out of the path of the fishing line to avoid entangling of the fishing line on the hook setting mechanism.

20 Claims, 3 Drawing Sheets

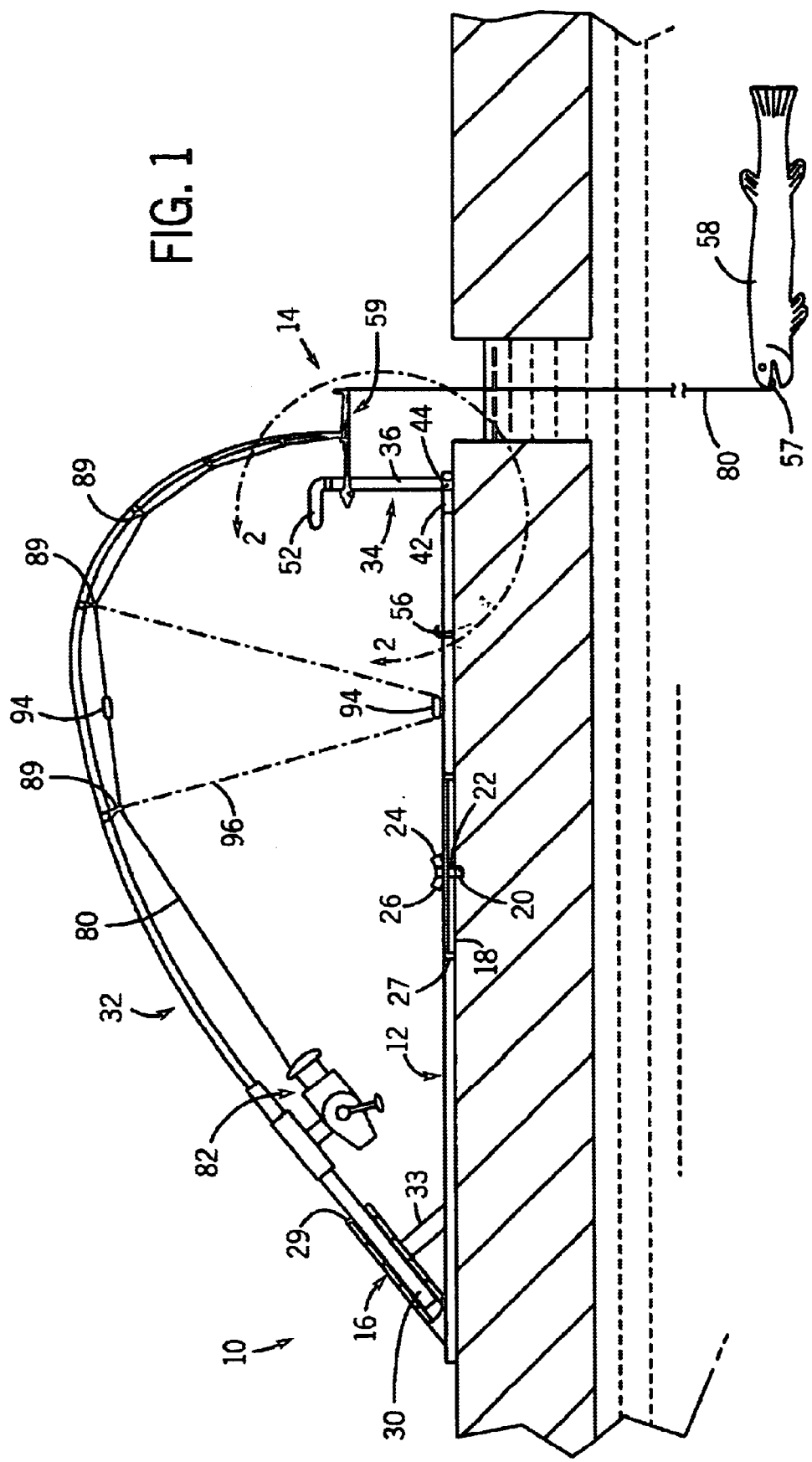

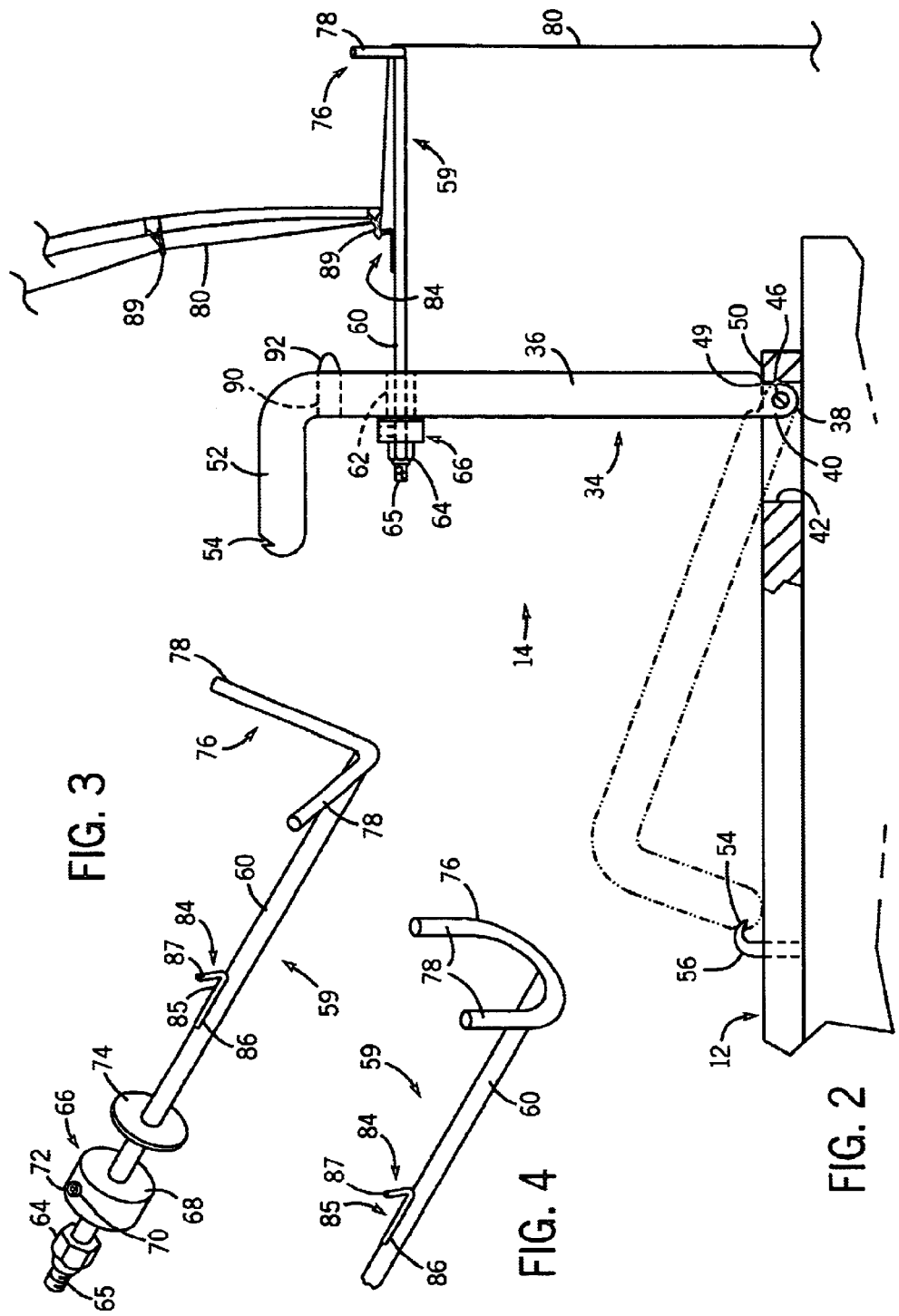

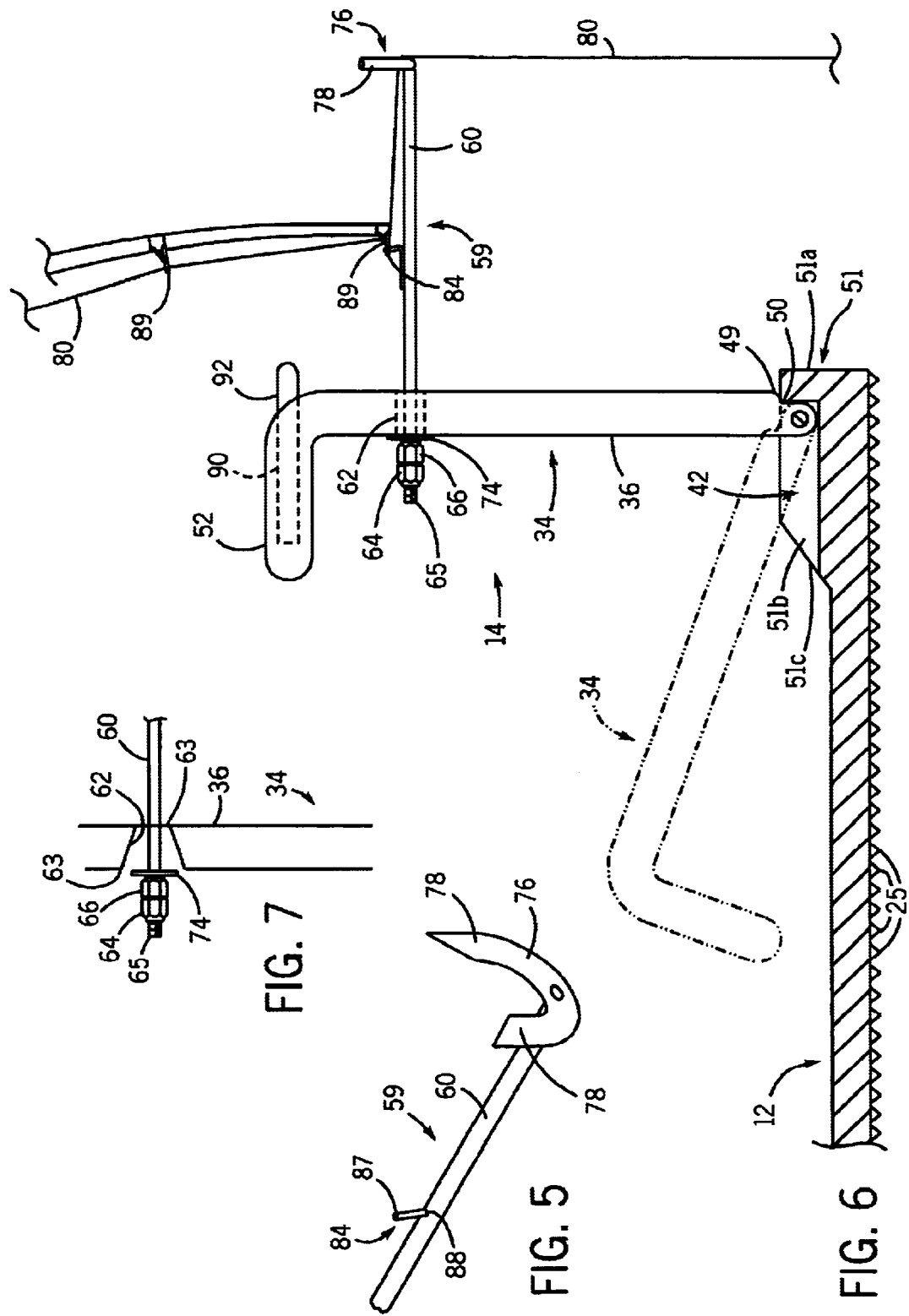

FISHING DEVICE

FIELD OF THE INVENTION

The present invention relates to fishing devices, and more specifically to a mechanical fishing device which automatically sets a hook in the mouth of a fish upon the fish striking bait held on a fishing line connected to the hook extending from the device.

BACKGROUND OF THE INVENTION

Many prior art hook setting devices and fishing mechanisms have been developed that are capable of setting a hook which operably is attached to the device in the mouth of a fish that strikes the hook. These devices and mechanisms set the hook in the mouth of a fish in various ways, as illustrated in prior art U.S. Pat. Nos. 2,984,039; 3,686,785; 4,193,220; 4,354,324; 4,993,181; and 5,249,387, all of which are incorporated herein by reference.

However, in each of these prior art devices, the devices are often difficult to set up and operate due to the complicated trigger mechanisms utilized in the devices, or due to the large size of the devices, in general. Further, based on the different mechanical actions employed by the various devices to set the hook in the mouth of the fish, many of these prior art devices are unstable in their design, as the force generated by the action of the device is more than sufficient to tip over the device, thereby possibly allowing the fish to shake the hook. Also, in many of these prior art devices the force generated by the mechanical action used cannot be adjusted due to the configuration of the device, such that the device cannot be changed in order to remedy the above problems.

Therefore, it is desirable to develop a hook setting mechanism for a fishing device that utilizes only the amount of force necessary to effectively set the hook in the mouth of the fish. The mechanism should be very simple in construction, making the mechanism easy to set up, adjust and use, so that it can be positioned on a base designed not to tip over based upon the amount of force utilized by the mechanism in setting the hook.

SUMMARY OF THE INVENTION

It is an object of the present invention to provide a hook setting mechanism for a fishing device which can be manufactured from a small number of easy to assemble and durable parts.

It is another object of the present invention to provide a hook setting mechanism that is easy to position in an operative configuration due to the small number of parts of the mechanism.

It is a further object of the present invention to provide a hook setting mechanism that can be adjusted to effectively set the hook in the mouth of a fish without utilizing more force than is necessary to effectively set the hook.

It is still another object of the present invention to provide a hook setting mechanism that is positioned on a fishing device having a base which is configured to engage the mechanism in a non-operative position to prevent the mechanism from interfering with the landing of a fish hooked using the mechanism.

The present invention is a fish hook setting mechanism that is positionable on a fishing device to reliably and easily set a hook in the mouth of a fish. The device includes a base which forms a stable support for the mechanism, allowing the mechanism to be placed on any relatively flat surface, such as a pier or ice formed on a frozen lake. The base includes a fishing rod holder at one end and supports the hook setting mechanism opposite the rod holder. To further increase the stability of the base, the base may also include a pivotable cross member secured to the base between the rod holder and the mechanism.

The hook setting mechanism includes an arm pivotally secured to the base such that the arm can pivot between an upright, operative position and a retracted or non-operative position. The arm includes an opening in which is disposed an elongate trigger that extends through the arm in a direction generally perpendicular to the arm. The trigger can have its operative length adjusted in order to supply the particular force necessary to hook the fish based on the properties of the fishing rod and fishing line being used with the device. The trigger includes a guide at one end and a tab spaced from the guide that are used to secure and align a fishing rod and fishing line on the trigger when the mechanism is in use.

In use, a handle on the fishing rod is inserted into the rod holder, and the rod is flexed and engaged with the tab on the trigger opposite the handle. In order to engage the rod with the tab, the arm of the hook setting mechanism is moved to the upright position such that the trigger is positioned generally horizontal with respect to the surface on which the device is resting. The fishing line extending from the rod is positioned over the guide and extends downwardly from the guide into the water in which the fish to be caught is located. When the fish strikes the line, the fish exerts a downward force on the line and the trigger, consequently disengaging the tab from the fishing rod. This allows the rod to straighten and extend upwardly due to the flexible nature of the rod, thereby pulling upwardly on and setting the hook in the mouth of the fish. Simultaneously, the arm pivots towards the base to the retracted position in order to move the arm and the trigger out of the area of the fishing line in order to prevent the line from being snagged and/or breaking on the trigger prior to an individual being able to land the fish secured to the hook.

Numerous additional features, aspects and embodiments of the present invention will be made apparent from the following detailed description taken together with the drawing figures.

BRIEF DESCRIPTION OF THE DRAWINGS

The drawings illustrate the best mode currently contemplated of practicing the present invention.

In the drawings:

FIG. 1 is a partially broken away side plan view of a fishing device incorporating the hook setting mechanism of the present invention;

FIG. 2 is a partially broken away cross-sectional view along line 2—2 of FIG. 1; and FIG. 3 is an isometric view of the trigger utilized with the hook-setting mechanism of FIG. 1;

FIG. 4 is an isometric view of a second embodiment of the trigger of FIG. 3;

FIG. 5 is an isometric view of a third embodiment of the trigger of FIG. 3;

FIG. 6 is a partially broken away cross-sectional view of a second embodiment of the fishing device of FIG. 1; and FIG. 7 is a partially broken away cross-sectional view of a second embodiment for an arm of the device of FIG. 1.

DETAILED DESCRIPTION OF THE DRAWINGS

With regard now to the drawing figures in which like reference numerals designate like parts throughout the disclosure, a fishing device is indicated generally at 10 in FIG. 1. The device 10 includes a base 12 having a hook setting mechanism 14 at one end and a rod holder 16 at the opposite end. The device 10 also includes a support member 18 pivotally attached to the base 12 between the mechanism 14 and the rod holder 16. The support member 18 is secured to the base 12 by a bolt 20 inserted through an opening 22 in the support member 18 that is aligned with an opening 24 in the base 12 and secured therein by a suitable fastener, such as a wing nut 26. The support member 18 is pivotal with regard to the base from a retracted position where the support member 18 is positioned entirely within a recess 27 formed on an underside of the base 12 to a position where the support member 18 extends outwardly perpendicular to the base 12 to provide additional stability to the device 10 by increasing the "footprint" of the base 12 on the surface 28, such as ice, on which the device 10 is placed. Also, to assist the support member 18 is holding the base 12 on the surface 28, the base 12 can include a number of teeth 25 disposed on the bottom of the base 12 around the support member 18 in order to enable the base to better grip the surface 28. The teeth 25 can also be disposed on the support member 18, if desired.

The rod holder 16 is formed as a generally cylindrical member 29 fixed to and extending upwardly at an angle with respect to the base 12. The rod holder 16 has an inner diameter sufficient to receive a handle 30 of a fishing pole 32 in order to securely retain the handle 30 within the rod holder 16. The rod holder 16 can be integrally formed with the base 12, or can be formed separately from the base 12 and attached to the base 12 utilizing a separate securing member, such as a bracket 33 and/or hinge (not shown) that enables the rod holder 16 to be moved between operative and collapsed positions. In either embodiment, the rod holder 16 and the base 12 are formed of a generally rigid material, such as a metal or a hard plastic. Most preferably, the rod holder 16 and the base 12 are formed of a thermosetting plastic resin in order to enable the rod holder 16 and base 12 to be formed, whether separately or integrally, in a simple injection molding process.

Looking now at FIGS. 1 and 2, opposite the rod holder 16, the mechanism 14 includes an arm 34 pivotally secured to the base 12. The arm 34 is formed of a rigid material similar to the base 12 and includes a first portion 36 having an outwardly extending spur 38 that defines a transverse channel 40 therein. The spur 38 and channel 40 are positionable within a cavity 42 formed in the base 12 which includes a pair of openings 44 on opposite sides of the cavity 42. When the channel 40 and the spur 38 are aligned with the openings 44 in the cavity 42, a bolt 46 can be inserted through the channel 40 and openings 44 and secured therein with a nut (not shown) in order to pivotally secure the arm 34 to the base 12. Further, the spur 38 extends outwardly from the first portion 36 over only a portion of the overall width of the first portion 36, forming an annular shoulder 49 between the spur 38 and the first portion 36. The shoulder 49 engages and rests on a front edge 50 of the recess 42 in the base 12 when the arm 34 is in the upright position. Thus, the front edge 50 prevents the arm 34 from pivoting past the vertical with respect to the base 12 for reasons to be described later.

Alternatively, in a second embodiment for the base 12 shown in FIG. 6, the cavity 42 is formed on a pedestal 51 disposed opposite the rod holder 16. The front edge 50 is disposed at a forward end 51a of the pedestal and the cavity 42 is disposed between the front edge 50 and a pair of opposed side walls 51b including the openings 44 and extending from the forward end 51a to an open rearward end 51a. In either embodiment, the cavity 42 is formed to have a width slightly greater than the width of the first portion 36 such that the arm 34 can pivot freely with regard to the base 12.

Opposite the spur 38, the arm 34 can also include a second portion 52 that extends generally perpendicularly from the first portion 36. The second portion 52 extends from the first portion 36 towards the rod holder 16 in order to move the center of gravity for the arm 34 laterally from the center of the first portion 36 towards the rod holder 16, such that the arm 34 tends to pivot downwardly towards the base 12 in an unbiased condition. Opposite the first portion 36, the second portion 52 also includes a notch 54 that is releasably engageable with a catch 56 disposed on an upper surface of the base 12 when the arm 34 is pivoted downwardly onto the base 12. The engagement between the notch 54 and the catch 56 effectively prevents the arm 34 from moving with respect to the base 12 when the device 10 is not being used, or when the mechanism 14 has just set a hook 57 in the mouth of a fish 58 in order to prevent the arm 34 from interfering with the landing of the fish 58. The second portion 52 can be formed integrally with the first portion 36, or separately in order to enable the second portion 52 to be omitted from the device 10, if desired. Further, the second portion 52 can also be secured to the first portion 36 at a location other than opposite the base 12 in order to provide the appropriate counterweight effect to the arm 34.

The mechanism 14 further includes a trigger 59 movably secured to the first portion 36 of the arm 34. The trigger 59 is formed as an elongate rod 60 formed of a rigid material, such as a metal or a hard plastic, that extends through an opening 62 in the first portion 36 spaced from the second portion 52. The inner diameter of the opening 62 is greater than the outer diameter of the rod 60 such that the rod 60 can move freely within the opening 62. However, the rod 60 is prevented from falling out of the opening 62 by a threaded lock nut 64 engaged with a threaded end 65 of the rod 60 and by a sliding stop 66 movably disposed on the rod 60 inwardly from the lock nut 64. The stop 66 has an outer diameter greater than the diameter of the opening 62 such that the stop 66 engages the arm 34 around the opening 62 to prevent the stop 66 and rod 60 from passing completely through the opening 62. The stop 66 can comprise either a second lock nut 64, as shown in FIG. 6, or a locking collar 68, as shown in FIGS. 2 and 3, that is slidably positioned around the rod 60 and including a radial opening 70 in which is positioned a screw 72 that can engage the rod 60 to fix the collar 68 in a desired position on the rod 60. This enables an individual to adjust the tension in the rod 30 that is connected to the trigger 59 by changing the amount the rod 30 needs to be flexed in order to engage the trigger 59. A washer 74 is disposed adjacent the collar 68 and opposite the nut 64. The washer 74 is formed of a relatively soft, low friction material in order to provide a cushioning member between the locking collar 68 and the first portion 36 to reduce the wearing of both the stop 66 and the an 34 due to the operation of the trigger 59.

The opening 62 may alternatively be cone-shaped as shown in FIG. 7, with a wide end 63a and a narrow end 63b. The washer 74 contacts the interior of the opening 62 to hold the trigger 59 on the first portion 36, but the shape of the opening 62 also allows for greater movement of the trigger 59 with respect to the arm 34 when the trigger 59 is being engaged or disengaged from the fishing pole 32.

Opposite the threaded end 65, the trigger 59 further includes a guide member 76. The guide member 76 is formed of a rigid material similar to the rod 60 and can be secured to the rod 60 by any conventional means, such as an adhesive, a mechanical fastener, or by welding, depending upon the material used to form the rod 60 and the guide member 76, or can be formed integrally with the rod 60. The guide member 76 includes a pair of upwardly extending arms 78 which can be formed in either a V-shaped, or a U-shaped configuration, as shown in FIGS. 3–5, and can be round or flat. The arms 78 of the guide member 76 serve to properly position and engage a fishing line 80 extending from the reel 82 on the fishing pole 32 such that the line 80 is properly positioned with respect to the water in which the fish 58 to be caught is located. Also, the line 80 is held in engagement with the trigger 59 by the guide member 76 such that any force exerted on the line 80 by the fish 58 will be transmitted to the trigger 59 in order to actuate the hook setting mechanism 14.

Disposed between the arm 34 and the guide member 76 is a stay 84 that is also attached to or integrally formed with the rod 60. In one embodiment, the stay 84 is formed as a generally rigid, L-shaped bar 85, including a horizontal portion 86 secured to the rod 60, and a vertical or generally vertical portion 87 extending upwardly from the horizontal portion 86. The vertical portion 87 is preferably positioned at an angle of between 60° and 90° with respect to the horizontal portion 85. The stay 84 may also be formed of only the vertical portion 87, as shown in FIG. 5, which can be inserted into an opening 88 in the rod 60 as secured therein, such as by an adhesive or welding. In either embodiment, the vertical portion 87 of the stay 84 is engageable with an eyelet 89 positioned on the fishing pole 32 opposite the handle 30. By engaging the eyelet 39, the stay 84 serves to maintain the fishing pole 32 in a flexed configuration shown in FIG. 1 until such time as the trigger 59 and mechanism 14 are actuated by the exertion of a sufficient force on the fishing line 80 by the fish 58.

Further, in order to enable the device 10 to be utilized in low light or nighttime conditions, the arm 34 also includes a light opening 90 disposed in the first portion 36 directly beneath the second portion 52 as shown in FIGS. 1 and 2, or in the second portion 52, as shown in FIG. 6. A light 92, such as a conventional mercury light, can be fixedly positioned within the opening 90 to provide a primary or supplemental light source when using the device 10.

In order to use the device 10, initially the support member 18 is pivoted with respect to the base 12 to provide a stable engagement with a surface 28 on which the device 10 is positioned. The handle 30 of the fishing pole 32 is then inserted into the rod holder 16, and the arm 34 is pivoted upwardly away from the catch 56 in order to position the arm 34 generally vertically in the operative position, with the trigger 59 positioned generally horizontally. The outermost eyelet 89 on the pole 32 is then engaged with the vertical portion 87 of the stay 84 such that the pole 32 is maintained in the flexed position shown in FIG. 1. The fishing line 80 connected to the reel 82 on the pole 32 is then positioned between the arms 78 of the guide member 76 and the line 80 is played out in order to locate a lure or bait (not shown) disposed on the hook 57 attached to the line 80 at a sufficient depth in the water below the surface 28. Additionally, the line 80 can be pulled from the reel 82 and a bobber 94 can be attached to the line 80 to provide an amount of slack line 96 between the reel 82 and the guide member 76. The slack line 96 and bobber 94 enable the fish 58 to completely swallow and swim away with the hook 57 for the length of the slack line 96 prior to the actuation of the mechanism 14. The movement of the bobber 94 on the slack line 96 from the initial position on the base 12 upwardly towards the rod 30 when the fish 58 takes the hook 57 also provides a visual indication that a fish 58 is about to be hooked by the mechanism 14.

Once the fish 58 has completely swallowed the hook 57 and is exerting a force on the line 80, the force exerted on the line 80 causes the trigger 59 to move downwardly, consequently disengaging the vertical portion 87 of the stay 84 from the eyelet 89. The pole 32 then immediately returns to the unflexed position, consequently pulling upwardly on the line 80 with a sufficient force to securely set the hook 57 in the mouth of the fish 58. Also, immediately after the eyelet 89 is disengaged from the stay 84, the arm 34 pivots downwardly towards the base 12 in order to move the arm 34 and trigger 59 out of the path of the line 80 such that the line 80 does not become entangled on either the trigger 59 or the arm 34. The arm 34 preferably pivots due to the effect of gravity on the arm 34, but can also be pivoted by a biasing member (not shown) positioned between the arm 34 and the base 12 that urges the arm 34 toward the base 12 against the bias of the flexed rod 30. The momentum of the arm 34 towards the base 12 forces the catch 56 on the base 12 to be engaged within the notch 54 on the second portion 52 of the arm 34 in order to maintain the arm 34 and trigger 59 in an inoperative position against the base 12. At this point, an individual can then remove the handle 30 from within the rod holder 16 and utilize the fishing pole 32 in a conventional manner to reel in the fish 58.

Various alternatives are contemplated as being within the scope of the following claims particularly pointing out and distinctly claiming the subject matter regarded as the invention.

We hereby claim:

1. A fishing device comprising:
   a) a base having a rod holder at one end; and
   b) a hook setting mechanism movably disposed on the base opposite the rod holder, the hook setting mechanism including an arm pivotally connected to the base and including an opening therethrough, and a trigger adjustably positioned within and extending outwardly from the opening, the trigger including a stop disposed at one end of the trigger that is engageable with the arm around the opening, a guide positioned on the trigger opposite the stop, and a stay positioned on the trigger between the stop and the guide.

2. The device of claim 1 wherein the stop is slidably mounted on the trigger.

3. The device of claim 2 wherein the stop includes a locking collar positioned around the trigger and having a radial opening extending therethrough, and a threaded member insertable within the radial opening and releasably engageable with the trigger.

4. The device of claim 1 wherein the trigger is formed of a generally rigid material.

5. The device of claim 1 wherein the stay is fixedly attached to the trigger.

6. The device of claim 1 wherein the stay extends upwardly from the trigger to define an angle between the stay and a trigger of between about 60 degrees and 90 degrees.

7. The device of claim 1 wherein the arm is formed of a generally rigid material.

8. The device of claim 1 wherein the guide is fixedly attached to the trigger.

9. The device of claim 1 wherein the guide includes a pair of opposed upwardly extending arms.

10. The device of claim 9 wherein the guide is U-shaped.

11. The device of claim 1 wherein the arm includes an annular shoulder engageable with the base.

12. The device of claim 1 further comprising a catch located on the base and spaced from the arm, the catch engageable with a notch on the arm when the arm is positioned against the base.

13. The device of claim 1 wherein the arm includes a first portion connected to the base and including the opening and a second portion extending generally perpendicularly from the first portion opposite the base.

14. A hook setting mechanism for a fishing device including a fishing rod holder, the hook setting mechanism comprising:
   a) an arm adapted to be pivotally secured to the fishing device, the arm including a first portion having a trigger opening and a second portion connected to the first portion; and
   b) a trigger adjustably positioned within the trigger opening, the trigger including a stop disposed at one end of the trigger and engageable with the arm around the trigger opening, a guide attached to the trigger opposite the stop and a stay disposed on the trigger between the stop and the guide, the stay releasably engageable with a tip of a fishing rod positioned within the fishing rod holder.

15. The mechanism of claim 14 wherein the second portion of arm is fixedly connected to the first portion.

16. The mechanism of claim 14 wherein the second portion of the arm further includes a light opening spaced from the trigger opening that is adapted to receive and retain a light source.

17. The mechanism of claim 14 wherein the stop comprises at least one lock nut.

18. A method for setting a hook in the mouth of a fish, the method comprising the steps of:
   a) providing a fishing device including a base having a rod holder at one end, and a hook setting mechanism opposite the rod holder, the hook setting mechanism including an arm having a first portion and a second portion, the first portion pivotally connected to the base and including an opening therethrough, and a trigger positioned within and extending outwardly from the opening in the first portion, the trigger including a stop adjustably disposed at one end that is engageable with the first portion of the arm around the opening, a guide positioned opposite the stop, and a stay positioned between the stop and the guide;
   b) placing the device on a surface;
   c) inserting a fishing rod into the rod holder,
   d) engaging the rod opposite the rod holder with the stay on the trigger; and
   e) disengaging the rod from the stay.

19. The method of claim 18 wherein the fishing rod includes a pole having a handle at one end, a number of eyelets positioned along the pole and a fishing line extending from a reel disposed on the pole adjacent the handle through each of the eyelets, and wherein the step of engaging the rod with the stay comprises the steps of:
   a) pivoting the arm in a first direction with respect to the base;
   b) positioning an eyelet located on the pole opposite the handle around the stay on the trigger; and
   c) placing the fishing line within the guide.

20. The method of claim 18 wherein the step of disengaging the rod from the stay comprises the steps of:
   a) disengaging the eyelet on the pole opposite the handle from the stay in response to a downward force exerted on the trigger;
   b) moving the rod away from the trigger; and
   c) pivoting the arm in a second direction with respect to the base.

* * * * *